United States Patent [19]
Weitbrecht et al.

[11] Patent Number: 5,639,002
[45] Date of Patent: Jun. 17, 1997

[54] COVERABLE CONTAINER FOR VEHICLES

[75] Inventors: Klaus Weitbrecht, Neuweiler; Jürgen Körber, Sindelfingen, both of Germany

[73] Assignee: Mercedes-Benz AG, Germany

[21] Appl. No.: 568,764

[22] Filed: Dec. 7, 1995

[30] Foreign Application Priority Data

Dec. 7, 1994 [DE] Germany ............... 44 43 521.5

[51] Int. Cl.⁶ .................................................. B60R 7/00
[52] U.S. Cl. ................... 224/539; 220/335; 297/188.19; 296/37.8
[58] Field of Search ............................. 224/539, 275, 224/282; 220/334, 335; 297/188.14, 188.19; 248/311.2; 296/37.1, 37.8, 37.15

[56] References Cited

U.S. PATENT DOCUMENTS

| 2,823,661 | 2/1958 | Grannan | 220/335 |
|---|---|---|---|
| 3,567,062 | 3/1971 | Reed | 220/335 |
| 3,682,348 | 8/1972 | Roberts | 220/335 |
| 4,460,105 | 7/1984 | Cox | 220/335 |
| 4,742,598 | 5/1988 | Bruneau | 220/335 |
| 4,756,459 | 7/1988 | Hardman | 296/37.15 |
| 4,882,804 | 11/1989 | Frye et al. | 220/335 |

FOREIGN PATENT DOCUMENTS

| 677975 | 12/1929 | France | 224/527 |
|---|---|---|---|
| 25 24 532 | 12/1976 | Germany | |
| 40 25 666 | 2/1992 | Germany | |
| 226430 | 12/1924 | United Kingdom | 220/335 |

Primary Examiner—Henry J. Recla
Assistant Examiner—Gregory M. Vidovich
Attorney, Agent, or Firm—Evenson, McKeown Edwards & Lenahan P.L.L.C.

[57] ABSTRACT

A coverable container for the seat-area of vehicles, having a box-like housing which is open towards the top, and a flap or cover which can be pivoted on the housing and is designed as an arm rest for a seat occupant. To provide a vertically adjustable arm rest, a support lever is articulated on the underside of the flap at a distance from the pivot axis of the flap, which support lever, by means of a latching lug, can latch, into latching grooves arranged one above the other. The support lever is guided, by means of a guide pin, in a guide track which has two separate, spaced-apart track sections connected by upper and lower junctions to provide a continuous guide track. A mechanism is provided for effecting a changeover of the guide pin in the junction such that an upwards movement of the guide pin takes place only in the track section in the vicinity of the latching strip, and a downwards movement of the guide pin takes place only in the track section remote from the latching strip, so that in its downward movement the latching lug of the support lever bypasses the latching groves.

6 Claims, 4 Drawing Sheets

COVERABLE CONTAINER FOR VEHICLES

BACKGROUND AND SUMMARY OF THE INVENTION

The invention relates to a coverable container for the seat-area of vehicles, particularly for arranging between the front seats of a motor vehicle.

German Patent Document No. DE 40 25 666 C1 discloses a container of this type, whose closure flap or closure cover functions as an arm rest or arm support. In this arrangement it is possible to pivot the flap, in order to access the interior of the container, through somewhat more than 90° into its open position about its pivot axis arranged in the vicinity of the rear, narrow side wall of the housing. In the open position the flap is secured against falling back inadvertently by means of an arresting lever which consists of a slide lever and of a spiral spring. The arresting lever, which is retained pivotably on the hinge, engages with a latch provided in the flap interior, and which can be overcome by pushing the flap back manually.

German Patent Document No. DE 25 24 532 A1 discloses a hinge for pivot-up flaps in which a support lever is mounted pivotably on a hinge part. At its end remote from the pivot bearing, the support lever is guided, by means of two guide pins projecting from it at right angles, in each case in a guide slot in a U-shaped guide strip arranged on the other hinge part. The guide pins interact with a locking member which can be moved to a limited extent in the interior of the hollow guide strip, such that the flap latches after being pivoted up. By briefly pivoting the flap further upward, it can be released from the latching means and guided back into its closed position again. The locking member is spring biased in a lower end position and bears a ramp and a latching groove with an inlet and outlet opening. Upon opening of the flap, the parallel guide slots force the guide pins over the ramp (the locking member pivoting in the process) until the pins, at the end of the ramp, latch into the latching groove via the inlet opening and lock the support lever, and thus the flap, against falling back upon release of the flap. If the flap is raised somewhat, then the guide pins slide out of the latching groove via the outlet opening and, when the flap pivots back, slide over and beyond the locking member, to be precise on its side remote from the ramp. The flap thus moves back into its closed position without obstruction.

The object of the present invention is to provide an improved container having a closure flap, serving as the arm rest, of the type mentioned above, such that, for the purpose of changing the vertical orientation of the arm rest, the flap can be transferred into a plurality of fixedly predetermined pivot positions and, in each pivot position, can reliably support the arm resting on the flap. In this arrangement, the function of the flap for releasing and closing off the container is not to be subjected to adverse effects.

This object is achieved according to the invention, in which by means of a mechanism of simple design, the flap, which functions as an arm support, is latched securely in a plurality of stages, which permit different adjustment of the flap and thus a different vertical position of the arm rest, and moves back into the closed position again after covering a relatively long pivot path, at the end of which the container opening is in a fully released position. In this arrangement, the design of the guide track prevents latching from taking place in an undesired manner, and even prevents any noticeable tendency thereof, upon pivoting-back of the flap.

According to a preferred embodiment of the invention, in order to realize the changeover means for the guide pin, the latching spring is so designed, and is arranged relative to the guide track and to the support lever such that, over that displacement path of the support lever which extends over the latching-groove region of the latching strip, the latching spring acts on said support lever with a tensile force which forces the supporting lever towards the latching strip. Farther along the upwardly directed displacement path of the support lever, the spring is first relieved of tension and then compressed. The upper junction of the two track sections of the guide track is arranged in the region where the latching spring becomes compressed. This configuration has the advantage that there is no need for any additional structural elements to change over the guide pin in the two "upwards" and "downwards" displacement phases of the support lever.

According to a further embodiment of the invention, the guide pin is preferably arranged on the support lever in the vicinity of the latching lug thereof. The latching spring is designed as the tension spring which is fitted at one end on the supporting lever, in the vicinity of the guide pin, and fitted at the other end on the latching strip, at a location which is next to the upper end of the guide track.

In an alternative embodiment of the invention, the means for changing over the guide pin utilizes not only the latching spring, but also an additional spring. The latching spring is arranged as a tension spring, and acts on the support lever with a tensile force which is effective over its entire displacement path. The spring forces the support lever in the direction of the latching strip. In contrast, the second spring exerts a force on the support lever, in the region of the upper junction of the track sections of the guide track, directed away from the latching strip.

According to another advantageous embodiment of the invention, the latching strip, the guide and the latching spring and also the second spring, are arranged on the hinge which establishes the pivot axis of the flap. The hinge is fastened on a vertical housing wall. In this manner, after the housing has been installed in the vehicle, the flap can be mounted, very quickly and easily with the pre-mounted structural unit comprising flap and hinge. During the pre-mounting of the structural unit, the lever arm is fastened at a pivot point in the cover and inserted into the guide track by means of its guide pin. Thereafter, the latching spring is fitted on the lever arm and on the latching strip.

Other objects, advantages and novel features of the present invention will become apparent from the following detailed description of the invention when considered in conjunction with the accompanying drawings.

DETAILED DESCRIPTION OF THE DRAWINGS

Figure 1:
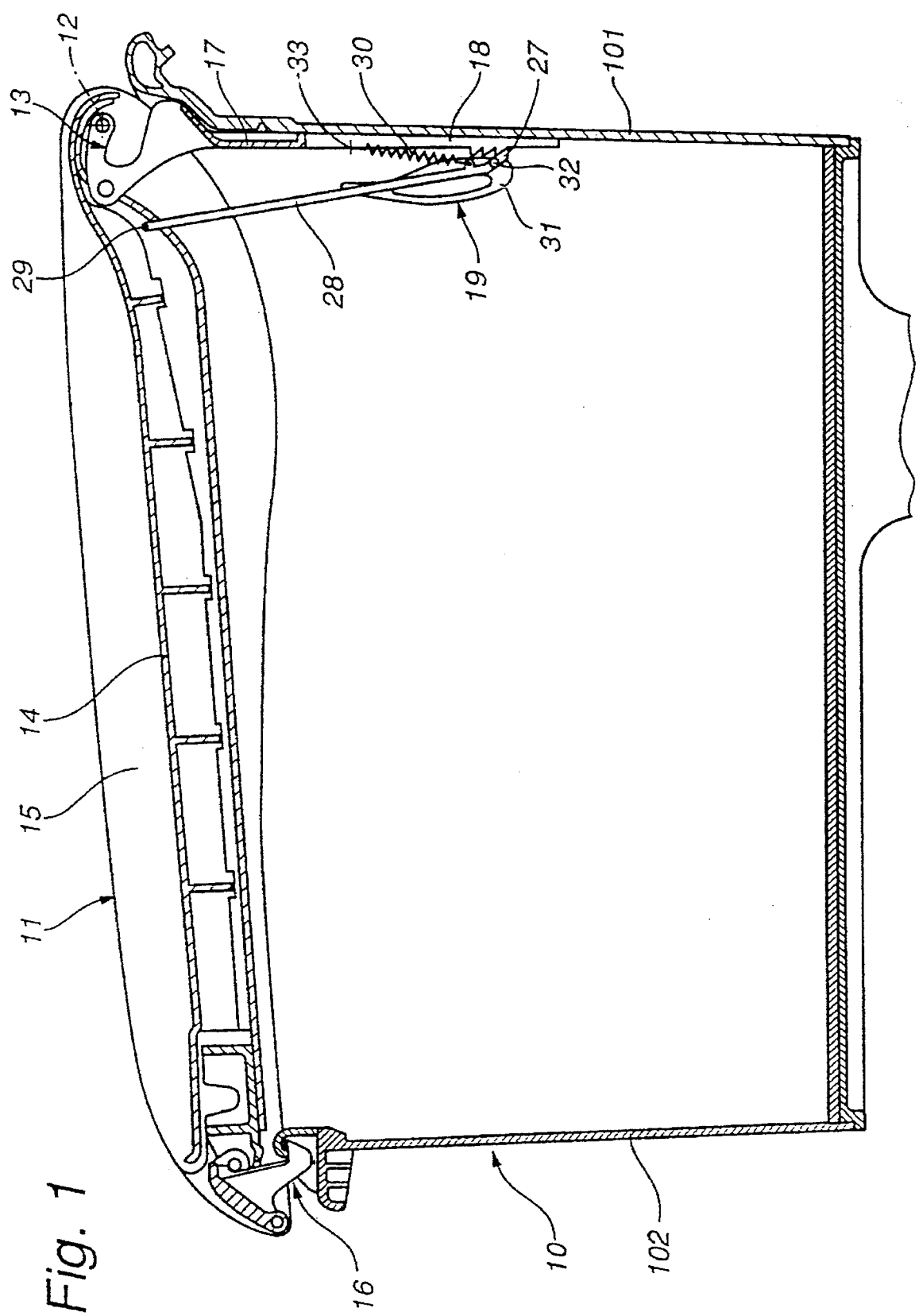
FIG. 1 shows a partial longitudinal section of a container with an arm support, formed thereon, in the closed state.

The container for a motor vehicle according to the invention is represented in longitudinal section in FIG. 1. It is fastened on the center console between the front seats of the passenger car and, in addition to receiving any desired articles, also serves as an arm support or arm rest for the driver or passenger. The container exhibits an elongate, box-like housing 10 which is open at the top and can be covered by means of a closure flap or of a closure cover 11. In this arrangement, the flap 11 can be pivoted about a pivot axis 12 which is fixed in a hinge 13 and is fastened on the narrow rearward end wall 101 of the housing 10 (toward the rear in the direction of travel). In this arrangement, the pivot axis 12 is aligned transversely with respect to the longitudinal axis of the housing 10, runs parallel to the longitudinal axis of the vehicle after the container has been mounted in the passenger car. The flap 11 itself comprises a plastic carrier 14 which is encapsulated by a rigid foam 15. A relatively thick foam cushion is provided on the upper side of the carrier 14 to serve as a comfortable arm rest. At its end remote from the hinge 13, the flap 11 can be locked, by means of a snap-type closure 16, on the narrow forward end wall 102, located opposite the housing side wall 101.

Figure 2:
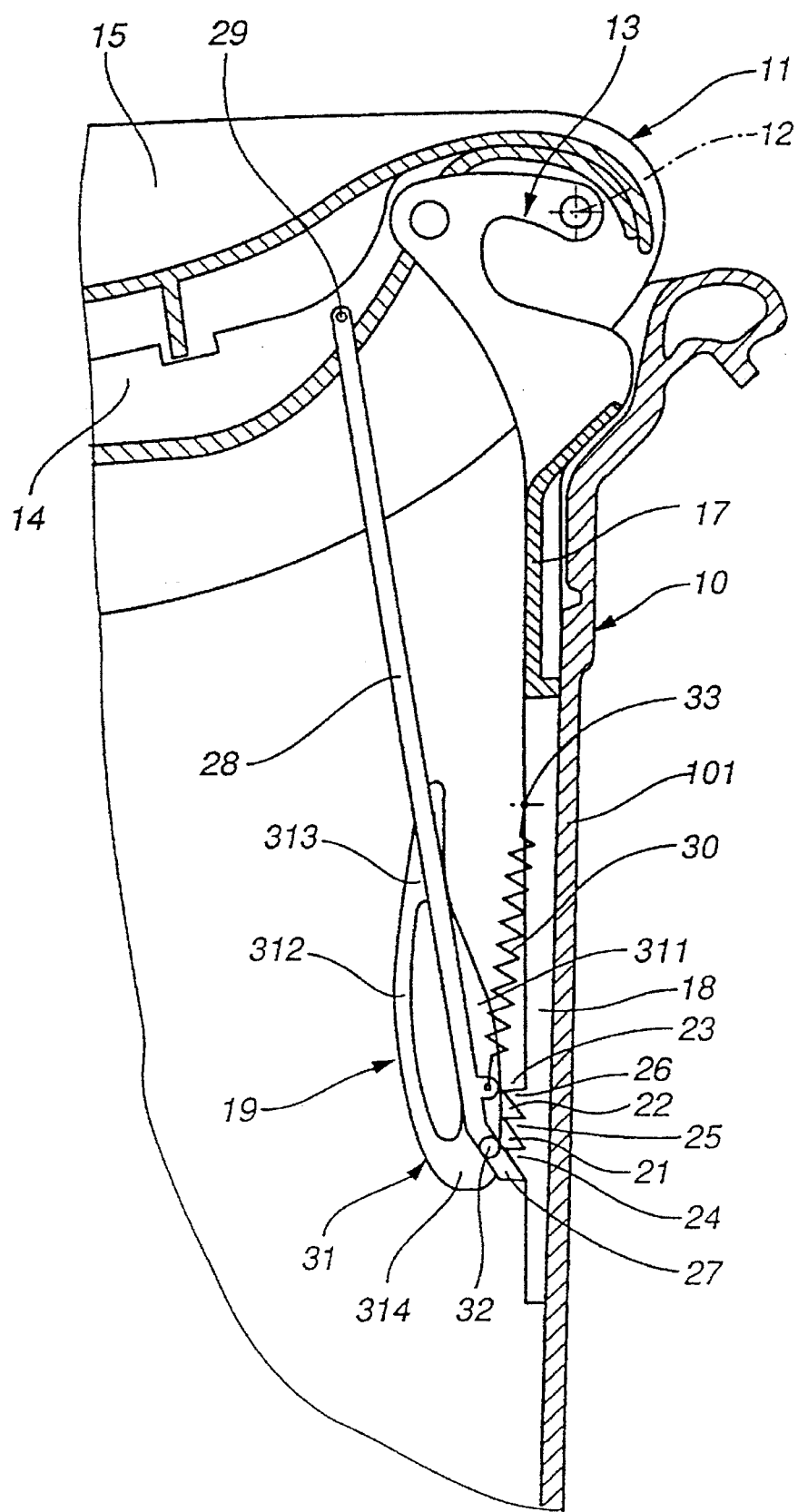
FIG. 2 shows, in detail form, an enlarged representation of FIG. 1.

As best seen in the enlarged representation of FIG. 2, the hinge 13 has an elongate hinge plate 17 which is fastened on the housing end wall 101, and on which a latching strip 18 and a guide 19 are formed, preferably integrally with the hinge plate 17. The latching strip 18 exhibits altogether three latching grooves 21, 22, 23, which are arranged vertically one above the other and are formed by the tooth gaps between three saw teeth 24, 25, 26 located one above the other. In this arrangement, each saw tooth 24–26 has a groove flank which is oriented downwards, runs at an acute angle with respect to the latching strip 18 and serves as a disengagement slope for a latching lug 27 as well as a tooth flank which is oriented approximately at right angles with respect to the latching strip 18 and serves as a supporting shoulder for the latching lug 27. The latching lug 27 is arranged at the free end of a support lever 28 which is mounted pivotably at a pivot point 29 on the carrier 14 of the flap 11. The latching lug 27 is pushed into the latching grooves 21–23 by a tension latching spring 30, which is schematically indicated in FIG. 2 and will be explained in more detail below.

The guide 19 has a continuous guide track 31 with two separate, spaced-apart track sections 311, 312 which are connected to one another via an upper junction 313 and a lower junction 314. A guide pin 32 projecting at right angles from the support lever 28 projects into the guide track 31. The guide track 31 extends over the entire displacement path which the guide pin 32 covers during the transfer of the flap 11 from its closed position (in which it closes off housing 10, as shown in FIG. 1) into its open position releasing the housing open to the full extent (FIG. 4).

One track section 311 of the guide track 31 extends in the vicinity of the latching strip 18, while the other track section 312 is remote from the latching strip 18. The arrangement and design of the latching spring 30 ensures then that, on the one hand, when the pivot lever 28 is displaced upwards upon pivoting-up of the flap 11, the guide pin 32 is guided in the track section 311. On the other hand, if the lever being displaced downwards again after the flap 11 has passed through a relatively long pivot path, the guide pin 32, in the region of the upper junction 313, passes into the track section 312 and, at the end of the flap movement, when the flap 11 is closed, the guide pin 32 changes over again, via the lower junction 314, out of the track section 312 into the track section 311.

The latching spring 30 is a tension spring which is fitted at one end on the support lever 28 in the vicinity of the guide 32, and at the other end on the latching strip 18, at a location 33 which is next to the upper junction 313 at the upper end of the guide track 31. Consequently, during the movement of the guide pin 32 in the guide track 31, starting from that position of the pivot lever 28 which is represented in FIG. 2, the latching spring 30 is first of all tensioned by the support lever 28, then relieved, subsequently compressed, relieved again and tensioned again. In its compressed state, the spring 30 changes over the guide pin 32 into the track section 312, by pivoting the support lever 28, and, in its tensioned state, changes over the guide pin 32 into the track section 311, by pivoting of the support lever 28.

Figure 3:
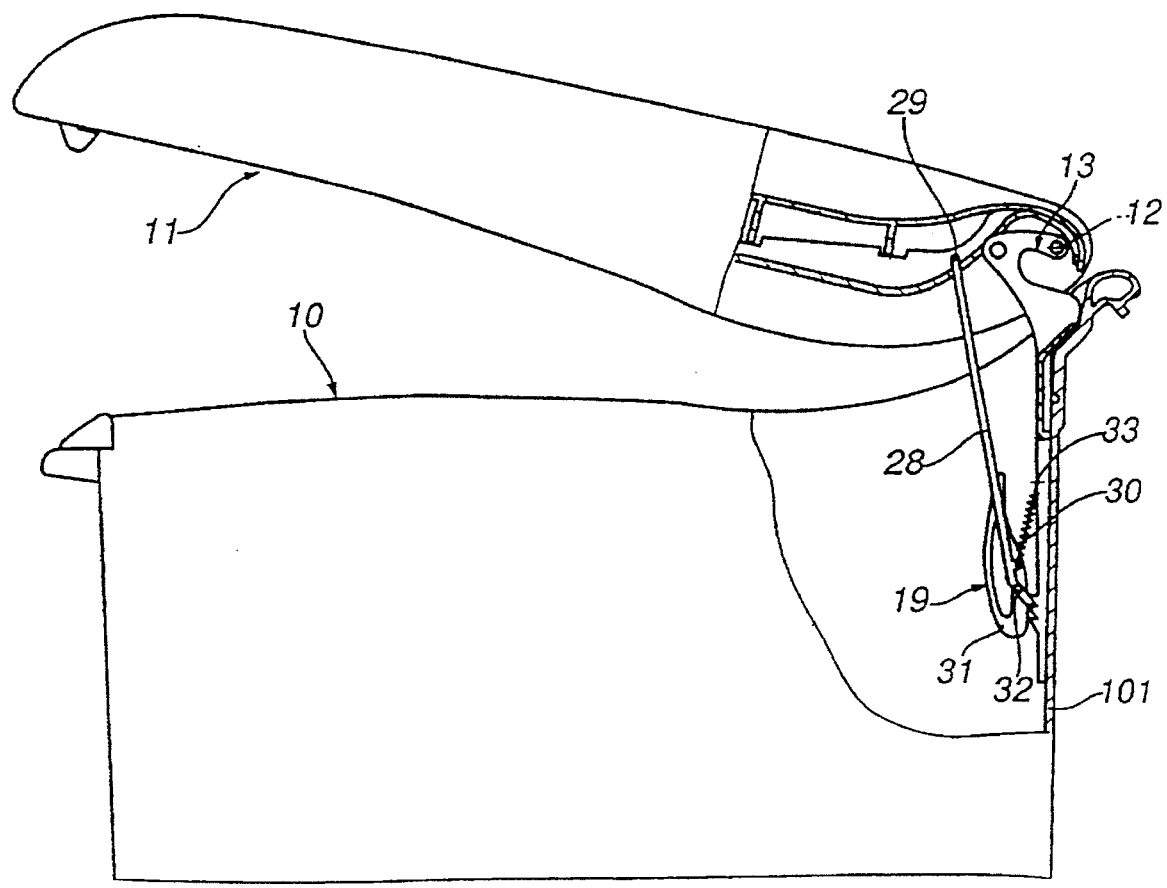
FIG. 3 shows, in detail form (and partially in section) a side view of the container in FIG. 1, with the arm support raised.
Figure 4:
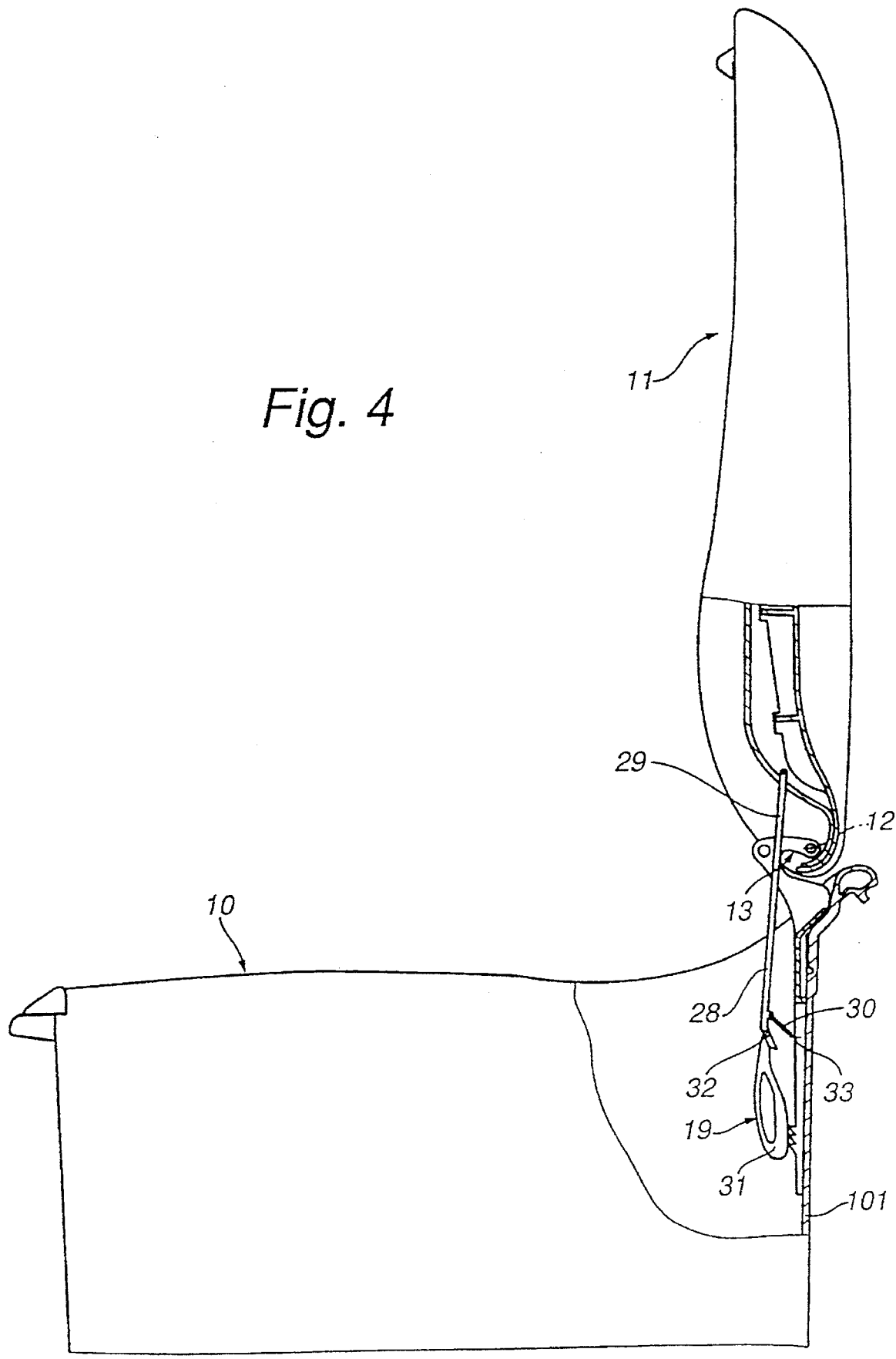
FIG. 4 shows, in detail form (and partially in section) the side view of the container in FIG. 1 in the open state.

The mode of operation of the described pivot and supporting mechanism for the flap 11 can be seen in FIGS. 1, 3 and 4. When the flap 11 is closed, the tensioned latching spring 30 presses the latching lug 27 on the support lever 28 against the sloping groove flank of the lowermost sawtooth 24, and also presses the guide pin 32 on the support lever 28 against the flank of the track section 311. If the flap 11 is pivoted in the opening direction in order to set the arm rest at a greater height, then the latching lug 27 slides over the tooth 24 and latches into the first latching groove 21. If the pivot movement of the flap 11 is stopped at this point, then the support lever 28 is supported, by its latching lug 27, on the horizontal tooth flank of the tooth 24. The flap 11, raised from the housing 10, for example, by an opening angle of 6°, is supported securely on the housing 10 in this pivot position and is capable of reliably retaining the load of an arm resting on it. If higher positions of the arm support are desired, then the flap 11 is transferred into the second latching groove 22 and the third latching groove 23 in the same manner, in which groove the support lever 28 is supported, by means of its latching lug 27, in the same manner on the horizontal tooth flanks of the sawtooth 25 and 26. The tensioning of the latching spring 30 ensures that the latching lug 27 cannot be disengaged from the latching groove 21-23 without the flap 11 being raised.

If the flap 11 is then pivoted farther into its open position represented in FIG. 4, the tension on latching spring 30 is relieved to an increasing extent, and finally to the full extent, after which it is then compressed by the support lever 28 sliding, by means of its guide pin 32, in the upper region of the track section 311 and in the upper junction 313, as shown in FIG. 4. (It is possible to perceive the compressed state of its schematically represented, considerably shorter spring length.)

If the flap 11 is pivoted back again after the guide pin 32 has been disengaged from the track section 311 and is located in the upper junction 313, then the pivot lever 28 is pivoted, by the compressed latching spring 30, until the guide pin 32 rests against the outer flank of the track section 312. If the pivot movement of the flap 11 is continued in its closure direction, then the guide pin 32 slides along in the track section 312, the latching spring 30 being tensioned again to an increasing extent by the support lever 28. Once the flap 11 has almost reached, or has reached, the upper housing border of the housing 10, then the guide pin 32 passes into the lower junction 314, and the support lever 28 is pivoted, by the tensile force of the tensioned latching spring 30, until its latching lug 27 rests once again against the sloping groove flank of the lowermost sawtooth 24. Consequently, the guide pin 32 has been transferred into the track section 311 again and rests against its outer track flank.

The latching grooves 21–23 of the latching strip 18 are arranged with respect to the flap 11 such that the opening angle of the flap 11 with respect to the housing 10 is 6° when the latching lug 27 latches into the lowermost latching groove 21, is 12° when the latching lug 27 latches into the second latching groove 22, and is 18° when the latching lug 27 latches into the third latching groove 23. When the housing 10 is opened to the fullest extent, the opening angle or the pivot angle of the flap 11 is 105°. As can be seen from FIG. 4, the guide pin 32 is then, located in the uppermost end of the guide track 31. In order to guide the flap 11 back out of one of the three latching positions into its closed position, it is not necessary for the flap 11 to be transferred into its last-mentioned 105°-pivot position. It is sufficient for the flap 11 to travel upwards over an albeit considerable pivot path beyond the latching region of the latching strip 18 until the guide pin 32 has passed into the upper junction 313 of the guide track 31.

In an alternative embodiment of the invention the latching spring 30 may be arranged such that it remains tensioned over the entire displacement of the support lever 28 and acts on the latter by means of a tensile force directed towards the latching strip 18. A further spring (not shown) is then fastened on the hinge plate 17, and exerts a spring force on the support lever 28, in the region of the upper junction 313. It thus presses the support lever 28, counter to the spring force of the latching spring 30, away from the latching strip 18 toward the track flank 312 of the guide track 31 which is farthest away 18. In this manner the from the latching strip guide pin 32 passes into the track section 312 again.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A mechanism for a coverable container for an area between the front seats of a motor vehicle, said container having a box-like housing which is open towards the top, and having a flap, for use as an arm rest, which can be pivoted on the housing by means of a hinge and closes off the housing opening, said mechanism comprising:

a support lever adapted to be articulated on the flap, on the underside thereof, at a distance from a pivot axis of the flap;

a latching strip adapted to be connected to the housing and having latching grooves arranged vertically thereon, one above another;

a latching lug formed on the support lever and adapted to engage with the respective latching grooves of the latching strip, preventing downward movement of said support lever and the flap articulated thereto;

a latching spring in connection with said strip which biases said latching lug of said support lever into engagement with said latching grooves of said latching strip;

a guide pin arranged on said supporting lever;

a guide in connection with said strip which has a continuous guide track with two separate spaced apart track sections, one of said track sections being adjacent said latching strip and one being remote from said latching strip, each extending over a displacement path of the guide pin, with an upper and a lower junction of the track sections, said guide track engaging with and guiding a path of movement of said guide pin; and means for causing a changeover of the guide pin in the guide track such that when the support lever is displaced upwards upon opening of the flap, the guide pin moves in the track section of the guide track which is adjacent the latching strip, and when the support lever is displaced downwards upon closure of the flap, the guide pin passes into the track section remote from the latching strip and, in the closed position of the flap, the guide pin changes over again into the other track section adjacent the latching strip.

2. A mechanism according to claim 1, wherein:

for changing over the guide pin, over that displacement path of the support lever which extends over the latching grooves of the latching strip, the latching spring exerts a tensile force on the support lever which forces the support lever towards the latching strip, and, further along the displacement path of the support lever, said spring sequentially relieved of tension and then compressed; and the support lever being located in the upper junction of the guide track when the latching spring is compressed.

3. A mechanism according to claim 2, wherein the guide pin is arranged on the support lever in the vicinity of the latching lug of the latter, and the latching spring is designed as a tension spring which is fitted at one end on the support lever, in the vicinity of the guide pin, and fitted at another end on the latching strip, at a location which is next to the upper junction of the guide track.

4. A mechanism according to claim 1, wherein the latching strip with the latching grooves, the guide with guide track, and the latching spring are adapted to be arranged on the hinge which establishes the pivot axis of the flap, and wherein the hinge is fastened on a vertical wall of the housing.

5. A mechanism according to claim 1, wherein three latching grooves are provided on the latching strip for a 6°-pivot position respectively, 12°-pivot position and an 18°-pivot position of the flap with respect to its closed position covering the housing opening of the housing.

6. A mechanism according to claim 5, wherein the latching grooves are formed by tooth gaps between three saw teeth arranged one above the other, and in that each saw tooth exhibits a tooth flank which acts as a disengagement slope and is inclined with respect to the latching strip and a tooth flank which acts as a supporting shoulder and is perpendicular with respect to the latching strip.

* * * * *